(12) United States Patent
Ohmika et al.

(10) Patent No.: US 6,349,785 B1
(45) Date of Patent: Feb. 26, 2002

(54) SCOOTER TYPE MOTORCYCLE (75) Inventors: Yasushi Ohmika; Yoichi Inayama, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/577,566

(22) Filed: May 25, 2000

(30) Foreign Application Priority Data

May 25, 1999 (JP) ............................................ 11-144444

(51) Int. Cl.[7] ........................... B62K 11/04; B62K 25/30
(52) U.S. Cl. ....................... 180/227; 180/219; 180/230
(58) Field of Search ................................. 180/219, 291, 180/227, 230, 231; 280/202, 284; 224/413, 415

(56) References Cited

U.S. PATENT DOCUMENTS

| 2,687,048 | A | * | 8/1954 | Butler | |
|---|---|---|---|---|---|
| 4,964,483 | A | * | 10/1990 | Yokoyama et al. | 180/219 |
| 5,020,847 | A | * | 6/1991 | Shih | 180/219 |
| 5,094,315 | A | * | 3/1992 | Taki et al. | 180/219 |
| 5,433,286 | A | * | 7/1995 | Kumamaru et al. | 180/219 |
| 6,073,719 | A | * | 7/2000 | Ohmika et al. | 180/219 |
| 6,142,253 | A | * | 11/2000 | Mueller et al. | 180/219 |

FOREIGN PATENT DOCUMENTS

JP 139397 8/1989

* cited by examiner

Primary Examiner—Anne Marie Boehler
(74) Attorney, Agent, or Firm—Birch, Stewart, Kolasch & Birch, LLP (57) ABSTRACT

A scooter type motorcycle is provided for improving a high speed travelling operation by forming a rear wheel supporting member, being a separate body from an internal combustion engine, in a freely swingable manner, for realizing efficient arrangement of parts, and for securing large spaces for floors. In a scooter type motorcycle having lower deck type floors, the scooter type motorcycle includes an internal combustion engine arranged rearwardly of the floors and on a downward side of a seat, and a rear wheel supported via a supporting member which is swingable independent of the internal combustion engine.

9 Claims, 6 Drawing Sheets

SCOOTER TYPE MOTORCYCLE

BACKGROUND OF THE INVENTION

1. Field of the Invention

This invention relates to a scooter type motorcycle having low deck type floor.

2. Description of Background Art

Generally, a unit swing type internal combustion engine is used together with a scooter type motorcycle The internal combustion engine unit integrally has a transmission that is supported on a base end thereof to a vehicle body via links. A rear wheel is pivotally supported at a rear end of the vertically freely swingable engine unit, and a cushion is interposed between the rear end thereof and the vehicle body.

Further, in a scooter type motorcycle, there is an example, as set forth in Japanese Examined Patent Publication No. H1-39397, wherein a transmission case which is a separate body from an internal combustion engine, is supported in a freely swingable manner together with a rear wheel which is pivotally supported at a rear end of the transmission case. In the scooter type motorcycle described in the Examined Japanese Patent, the transmission case is pivotally supported in a freely swingable manner around an output shaft located more rearwardly from a crank shaft of the internal combustion engine that is provided extending between left and right floor portions.

In a motorcycle mounting a former unit swing type internal combustion engine, there is a limit in a high speed traveling property since the weight under the shock absorber is heavy.

Further, since an entire internal combustion engine is swingable with respect to a vehicle body, a space on a periphery of the internal combustion engine must be secured for fear of interference thereof with the other parts, so that efficient arrangement of parts has been difficult.

In a latter example described in the Examined Japanese Patent, since the transmission case supporting the rear wheel is swingable around the output shaft located more rearwardly than that of the crank shaft, the wheel base is large in length.

Further, since the internal combustion engine is provided to extend to between the left and right floor portions, it has been impossible to secure a space for wide floor portions, and also it has been difficult to obtain a space to arrange accessories between the left and right floor portions.

SUMMARY AND OBJECTS OF THE INVENTION

In view of the foregoing circumstance, the present invention is directed to solving the above problems and it is an object of the invention to provide a scooter type motorcycle which is capable of improving a high speed traveling operation thereof. A rear wheel supporting member is provided that is a separate body from the internal combustion engine. The rear wheel supporting member is freely swingable. The present invention permits the arrangement of the parts in a efficient manner and permits wide spaces to be provided for the floors.

In order to achieve the object described above, a scooter type motorcycle is provided that includes low deck type floors. The scooter type motorcycle is constituted in such a manner that a internal combustion engine is arranged rearwardly of the floors and on a downward side of a rider's seat. A rear wheel is supported via a supporting member which is swingable independently of the internal combustion engine.

Since the rear wheel is supported via the supporting member which is swingable and independent of the internal combustion engine, the weight of a swingable section is made to be light, thus improving the high speed traveling operation of the motorcycle. Also the arrangement of the parts thereof can be made in an efficient manner because the size of the swingable section is small, thus there is no need to secure a large enough space on the periphery thereof.

Additionally, since the internal combustion engine is arranged rearwardly of the floors, the spaces for the floors can be secured wide and also the space for disposing accessories or the like can be provided on the floor portions.

In a scooter type motorcycle according to the present invention, the supporting member has a belt type automatic transmission and is pivotally supported coaxial with a crank shaft of the internal combustion engine.

Since the supporting member supporting a rear wheel is pivotally supported coaxial with the crank shaft of the internal combustion engine, a wheel base can be contracted in length, thus simultaneously a suitable space for disposing accessories and spaces for the floors can easily be secured on a forward side of the internal combustion engine.

In a scooter type motorcycle according to the present invention, cylinders of the internal combustion engine are tilted forward and a space for disposing accessories or articles is provided on a forward side of the forward tilted cylinders.

By tilting the cylinders forward, a seat above the cylinders can be set low, therefore a riding position can be secured in a very relaxing manner.

Since the space for disposing the accessories or the articles is provided on a forward side of the internal combustion engine, it is made possible to arrange parts in a good efficient manner.

In a scooter type motorcycle according to the present invention, a passenger's seat is provided rearwardly of a rider's seat at one stage high level, a helmet containing box is arranged on the downward side of the passenger's seat, and an air cleaner is arranged along a bottom face of the helmet containing box.

Since the passenger's seat is provided rearwardly of the rider's seat at a higher level, the helmet containing box is arranged on the downward side of the occupant seat, and the air cleaner is arranged along the bottom face of the helmet containing box, the helmet containing box provides a large space and the air cleaner can be arranged in a good space efficient manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an embodiment of the present invention will be described in detail with reference to FIG. 1 through FIG. 4.

Figure 1:
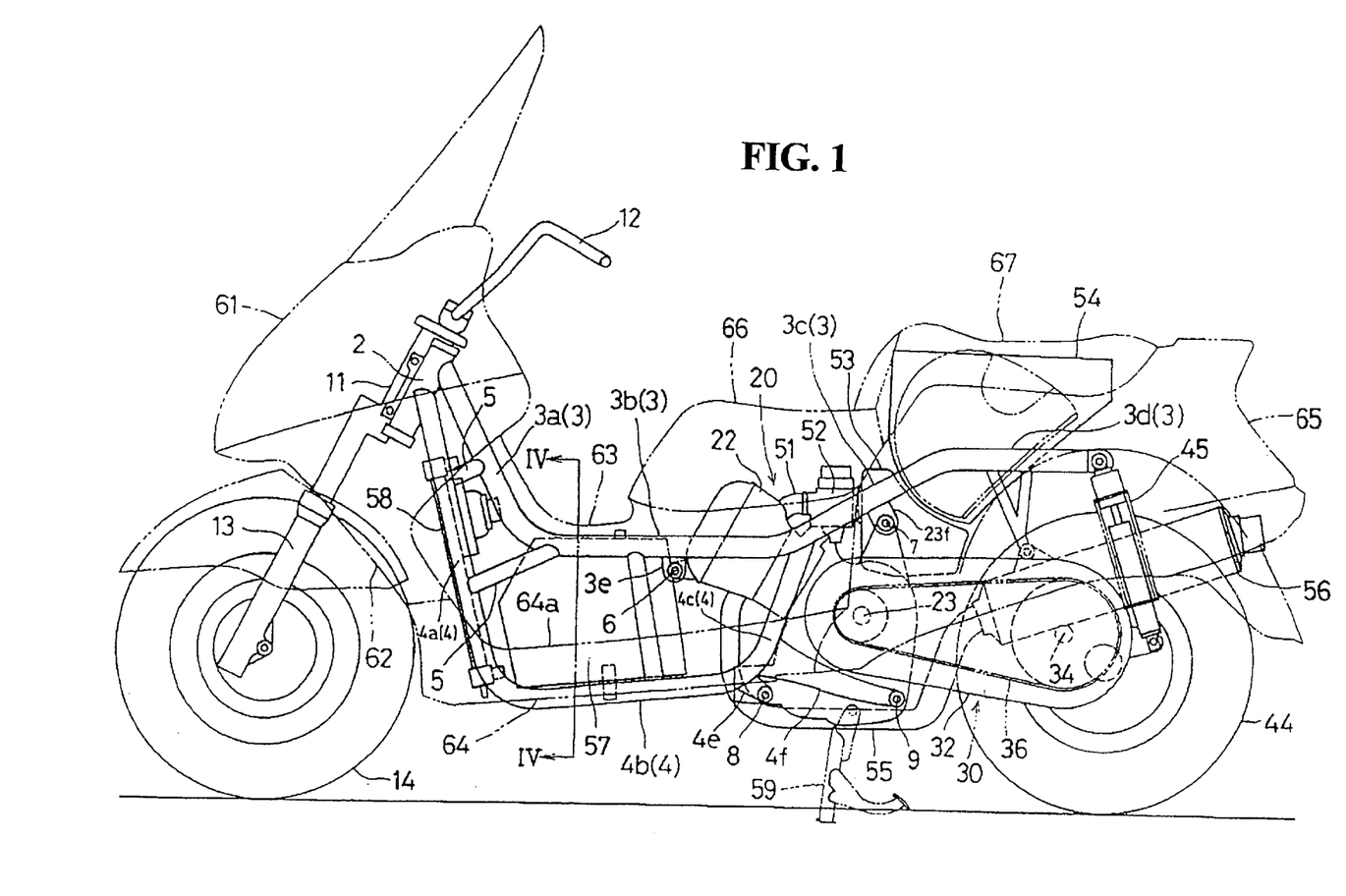
FIG. 1 illustrates a side elevation view illustrating an entire body of a scooter type motorcycle according to an embodiment of the present invention.
Figure 2:
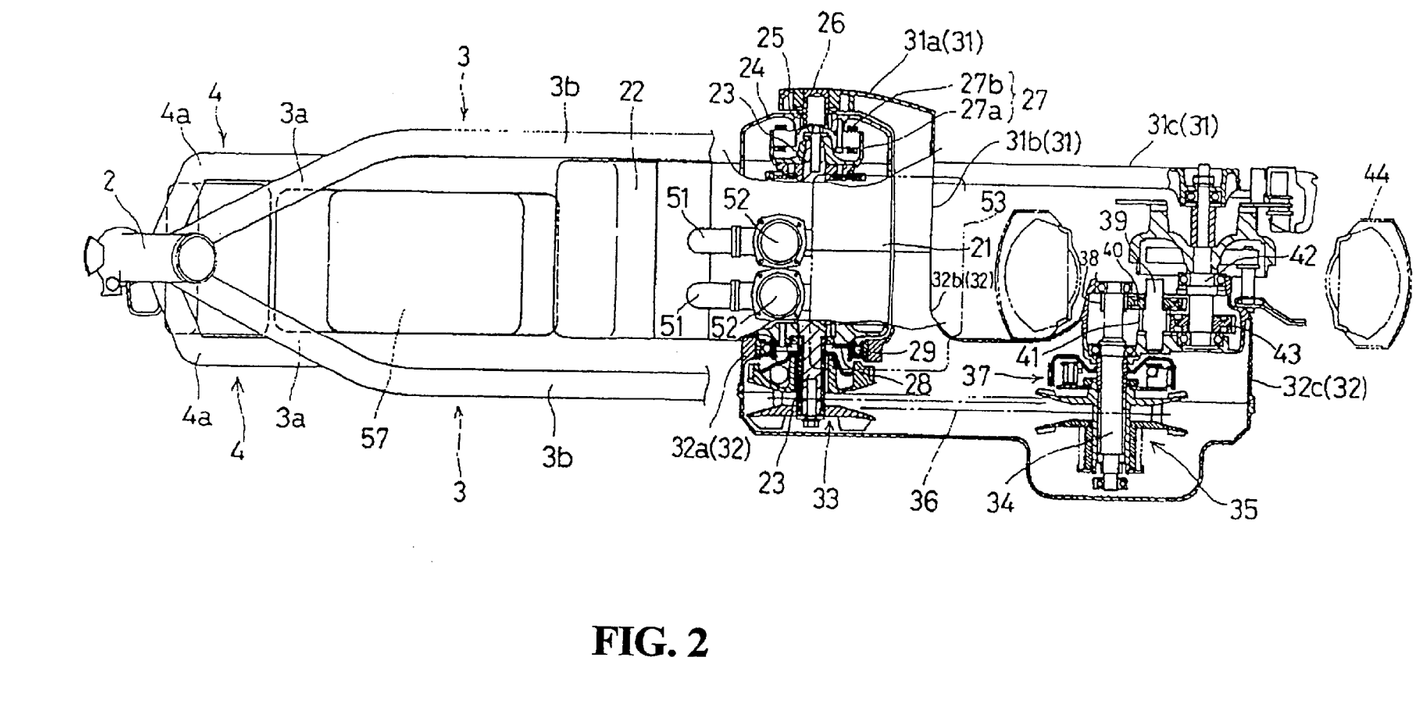
FIG. 2 illustrates a partly omitted plan view of FIG. 1.

FIGS. 1 and 2 show a side elevation view and a partly omitted top plan view illustrating an entire scooter type motorcycle 1 according to the present embodiment wherein a pair of left and right main pipes 3, 3 extend oblique downwardly on each side from an upper portion of a head pipe 2 of a vehicle body frame to compose front side inclination portions 3a, 3a that are bent rearwardly at bottom ends of the front side inclination portions 3a, 3a to form central parallel portions 3b, 3b that are bent somewhat oblique upwardly to compose rear side inclination portions 3c, 3c, and are bent in a horizontal direction to extend to rear side horizontal portions 3d, 3d.

A pair of left and right down pipes 4, 4 are laterally widened and extend downwardly from a lower portion of the head pipe 2 to compose front side vertical portions 4a, 4a, that are bent rearwardly at bottom ends thereof to form central horizontal portions 4b, 4b, the central horizontal portions extend substantially in parallel on lower sides of the central horizontal portion 3b, 3b of the main pipes 3, 3, and are bent upwardly at rear ends thereof 4b, 4b to compose rear side inclination portions 4c, 4c, upper ends thereof 4c, 4c are respectively coupled to rear ends of the central horizontal portions 3b, 3b of the main pipes 3, 3.

Approximately three pieces of coupling pipe 5 are interposed between the main pipe 3 and the down pipe 4.

A steering shaft 11 is pivotally supported by the head pipe 2, handles 12 and 12 are developed and formed in left and right directions upwardly from the steering shaft, front forks 13 that extend downwardly from the steering shaft, and a front wheel 14 is pivotally supported at the bottom ends of the forks 13.

Supporting brackets 3e, 3f are provided that protrude, respectively, at the central horizontal portion 3b and the rear side inclination portion 3c, of the main pipe 3. A supporting bracket 4e is provided that protrudes at a rear end of the central horizontal portion 4b of the down pipe 4, and a supporting bracket 4f having a long size is also provided that protrudes rearwardly from a lower portion of the rear side inclination portion 4c.

An internal combustion engine 20 is suspended by four portions of the supporting brackets 3e, 3f, 4e and 4f described above, on each of the left and right sides.

The internal combustion engine 20 is a four cycle two cylinder internal combustion engine and the internal combustion engine 20 is suspended by the vehicle body frame in such a manner that a crank case 21 is positioned rearwardly from the rear side inclination portion 4c of the down pipe 4, forward tilted cylinders 22 are inserted and postured between the rear side inclination portions 4c, 4c on both left and right sides and between the central horizontal portions 3b, 3b of the main pipes 3 on both left and right sides, and mount brackets and the like are provided that protrude at specified positions of the engine 20 and are respectively supported by the supporting brackets 3e, 3f, 4e and 4f via spindles 6, 7, 8 and 9.

A belt type automatic transmission 30 extends rearwardly by being pivotally mounted at a front portion thereof on the crank case 21 of this internal combustion engine 20.

Figure 3:
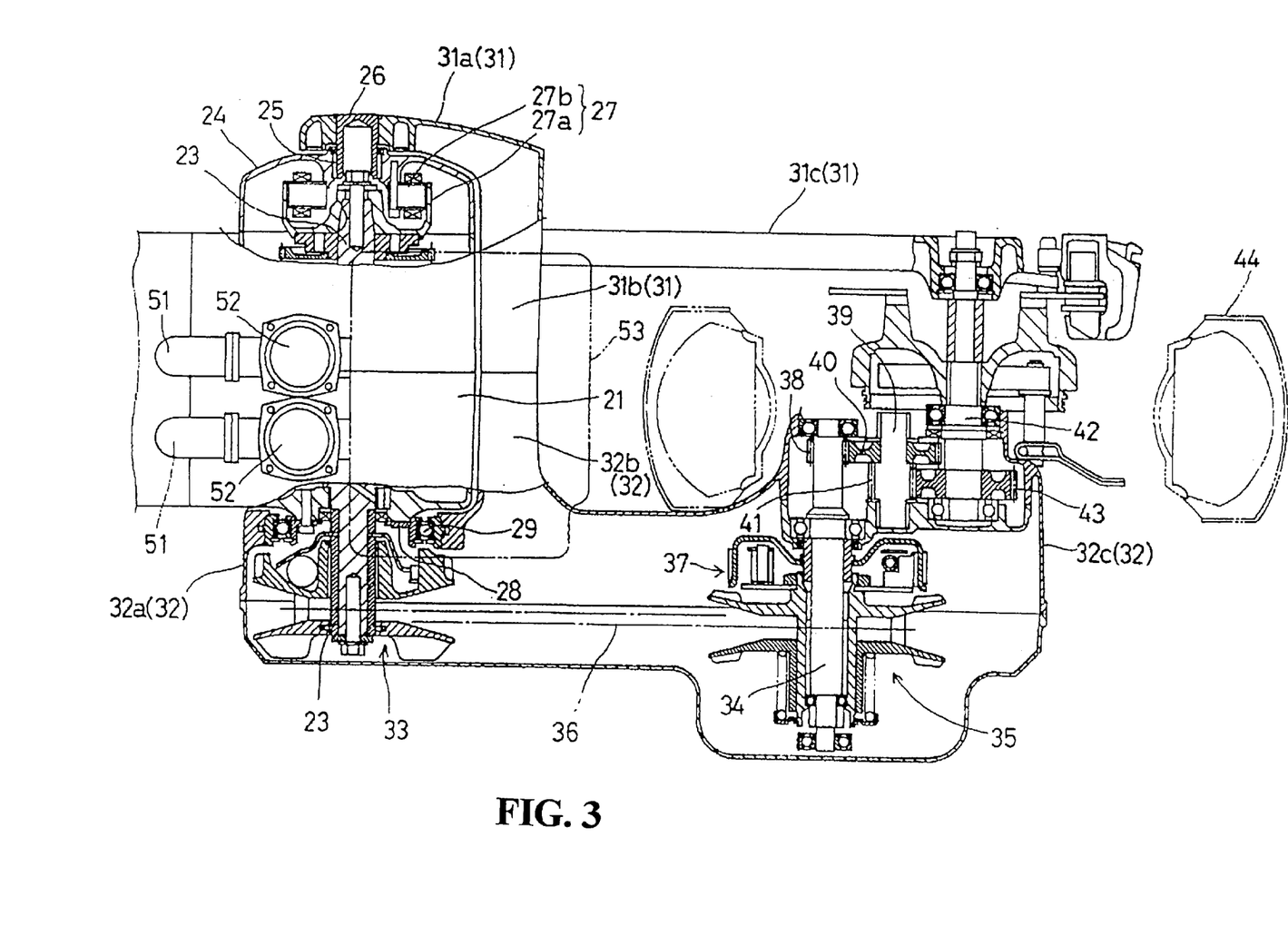
FIG. 3 illustrates an enlarged plan view illustrating essential portions of FIG. 1.
Figure 4:
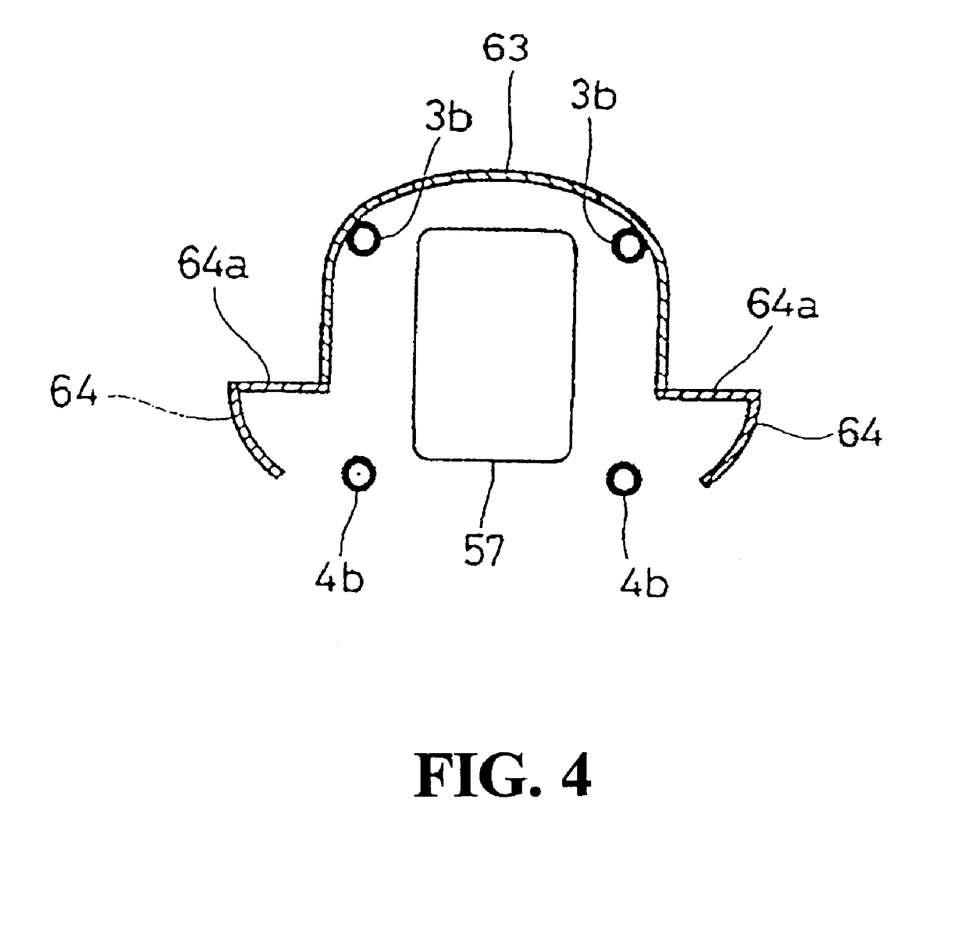
FIG. 4 illustrates a cross-sectional view typically illustrating parts taken on line IV—IV of FIG. 1.

An outer rotor 27a of an AC generator 27 is mounted on a right end of a crank shaft 23 directed in a lateral horizontal direction inside the crank case 21 as illustrated in FIG. 2 and FIG. 3, a cover case 24 covers the side of the outer rotor 27a, and an inner stator 27b of the AC generator 27 is supported by the cover case 24.

A rotary shaft 26 protrudes rightwardly in an opening portion coaxial with the crank shaft 23 of this cover case 24 via a bearing 25 and a front end portion 31a of a right side transmission case 31 of the belt type automatic transmission 30 is fittingly mounted on the portion that protrudes outwardly (refer to FIG. 3).

The right side transmission case 31 extends in a fork portion 31c thereof rearwardly via a coupling portion 31b that wraps around to an inner side parallel with a back face of the crank case 21 from the front end portion 31a.

On the other hand, a left end of the crank shaft 23 projects leftwardly by piercing through the crank case 21 and a drive pulley 33 including a centrifugal transmission mechanism is installed at this projecting portion.

An annular supporting member 28 is secured at a circumference of the crank case 21 on an outer side face of the crank case 21 through which the crank shaft 23 pierces and a front end portion 32a of a left side transmission case 32 is supported in a freely swingable manner on the annular supporting member 28 via a bearing 29.

The left side transmission case 32 has a coupling portion 32b wrapped around to an inner side parallel with the back face of the crank case 21 from the front end portion 32a and a fork portion 32c that extend rearwardly.

The left side and right side coupling portions 31b and 32b which are wrapped around along the back face of the crank case 21, are mutually coupled by coming into contact with each other, the left and right side transmission cases 31 and 32 are integrally united with each other, and the left and right side fork portions 31c and 32c are supported in a vertically freely swingable manner around the crank shaft 23.

In a rear portion of the fork portion 32c of the left side transmission case 32, a transmission chamber is provided with a driven shaft 34 which is supported in a freely rotatable manner, and a driven pulley 35 which is pivotally supported on the driven shaft 34 via a centrifugal clutch 37.

The belt type automatic transmission mechanism is constituted by suspending a V belt 36 between this driven pulley 35 and the drive pulley 33.

Inside the transmission chamber of the rear portion of the fork portion 32c, a reduction gear mechanism is constituted in such a manner that a small diametrical gear 38 of a right end of the driven shaft 34 is engaged with a large diametrical gear 40 on an intermediate shaft 39 and a small diametrical gear 41 of the intermediate shaft 39 is engaged with a large diametrical gear 43 of an axle 42.

The axle 42 is installed between the left and right side fork portions 31c and 32c, and a rear wheel 44 is supported on the axle 42 between the fork portions 31c and 32c.

Accordingly, the left and right side transmission cases 31 and 32 that support the belt type transmission 30 pivotally support the fork portions 31c and 32c together with the rear wheel 44 in a vertically swingable manner around the crank shaft 23.

A rear shock absorber 45 is interposed between a rear end of the left side transmission case 32 and a rear end of the main pipe 3.

Intake pipes 51, 51 that extend respectively upwardly from left and right side cylinders 22, 22, are bent rearwardly and are connected with carburetors 52, 52 disposed to be laterally arranged side by side on the crank case 21, and the carburetors 52, 52 are coupled on to an air cleaner 53 disposed in the rearward thereof.

The air cleaner 53 is arranged between the rear side inclination portions 3c, 3c, of the left and right side main pipes 3, 3 or below them and a helmet containing box 54 is installed and supported above the air cleaner 53 and between the rear side horizontal portions 3d, 3d.

The air cleaner 53 includes a top face thereof with a shape bent along a front side bottom face of the helmet containing box 54 and both the cleaner and the box are fitted together, therefore the large-sized and bulky helmet containing box 54 and the air cleaner 53 are arranged in a good space efficient manner.

Exhaust pipes 55, 55 respectively extend downwardly from the cylinders 22, 22 and further extend rearwardly after they are wrapped around to a lower side of the crank case 21, and are joined into one piece and erected and raised after coming out to a right side face of the vehicle body, and coupled to a muffler 56 supported on a right side of the rear wheel 44.

Further, a main stand 59 is mounted on a bottom end of the crank case 21 in a freely erectable or prostratable manner.

A fuel tank 57 is installed and supported on the forward side of the cylinders 22, 22 surrounded by four pieces of pipe such as the central horizontal portions 3b, 3b of the main pipe 3, 3 on an upper side and the central horizontal portions 4b, 4b of the down pipes 4, 4.

A radiator 58 is installed between the front side vertical portions 4a, 4a of the down pipe 4, 4.

The forward portion of the head pipe 2 is covered with a front cover 61. The left and right downward sides of the front cover 61 are covered with leg shields 62, the front side inclination portions 3a, 3a and the central horizontal portions 3b, 3b of the main pipes 3, 3 are covered with a floor tunnel cover 63 in a shape of a channel from the upward side, and floor covers 64, 64, having floor steps 64a, 64a extending horizontally in left and right sideward direction from left and right lower end edges of the floor tunnel cover 63 and cover the central horizontal portions 4b, 4b of the down pipes 4, 4 from the outside (refer to FIG. 4).

A rear side upper portion of the front tunnel cover 63 is opened largely in a shape of a U, the cylinders 22 and the carburetors 52 face to the large opening portion and a rear cover 65 is connected to a rear end edge of the floor tunnel cover 63 and covers from the sideward direction of the rear side inclination portions 3c, 3c, and rear side horizontal portions 3d, 3d of the main pipes 3, 3.

Further, a rider's seat 66 covers the opening in the shape of a U at a rear side upper portion of the floor tunnel cover 63 in a freely openable or closable manner while a front end thereof is pivotally supported and a passenger's seat 67 covers an upper portion opening of the rear cover 65 in a freely openable or closable manner while a rear end thereof is pivotally supported.

Accordingly, the rider's seat 66 covers the cylinders 22 and carburetor 52 from above and the passenger's seat 67 covers an opening of the helmet containing box 54 from above.

In the internal combustion engine 20 suspended by the vehicle body frame, since the cylinders are tilted forward, the rider's seat 66 covering on the upward side of the engine 20 can be arranged low, a riding position in a relaxed manner can be secured.

Further, since the passenger's seat 67 is provided rearwardly of the rider's seat 66 and at a higher level, the helmet containing box 54 can be arranged on the downward side of the passenger's seat 67. Also, since the air cleaner 53 is arranged along the bottom face of the containing box 54, the large-sized helmet containing box 54 and the air cleaner 53 can be arranged in a good space efficient manner.

Since the internal combustion engine 20 is located rearwardly from the foot rest floor portions 64b, 64b of the floor steps 64a, 64a, spaces for the floors can be secured wide enough without being hindered by the internal combustion engine 20.

Further, a large space can be secured on a front side of the internal combustion engine 20, thus, large-sized accessories such as a fuel tank 57 can be arranged.

Since the belt type transmission 30 is supported in a freely swingable manner separately from and independent of the internal combustion engine 20 suspended from the vehicle body frame by pivotally supporting the rear wheel 44 at a rear end thereof, a swingable section supported by the rear cushion 45 can remarkably lighten the weight thereof to such an extent that the internal combustion engine 20 is not integrated, thus a high speed traveling property as the scooter type motorcycle 1 can be improved.

Incidentally, a motorcycle conventionally having more or less 140 km/h as its maximum speed range can be enhanced up to approximately 160 km/h in the maximum speed range.

Since the transmission cases 31 and 32 pivotally supporting the rear wheel 44 are pivotally supported on the crank case 21 being coaxial with the crank shaft 23, a wheel base can be contracted in length and simultaneously an appropriate space for disposing of parts and spaces for the floors are facilitated to be secured on the front side of the internal combustion engine 20.

Figure 5:
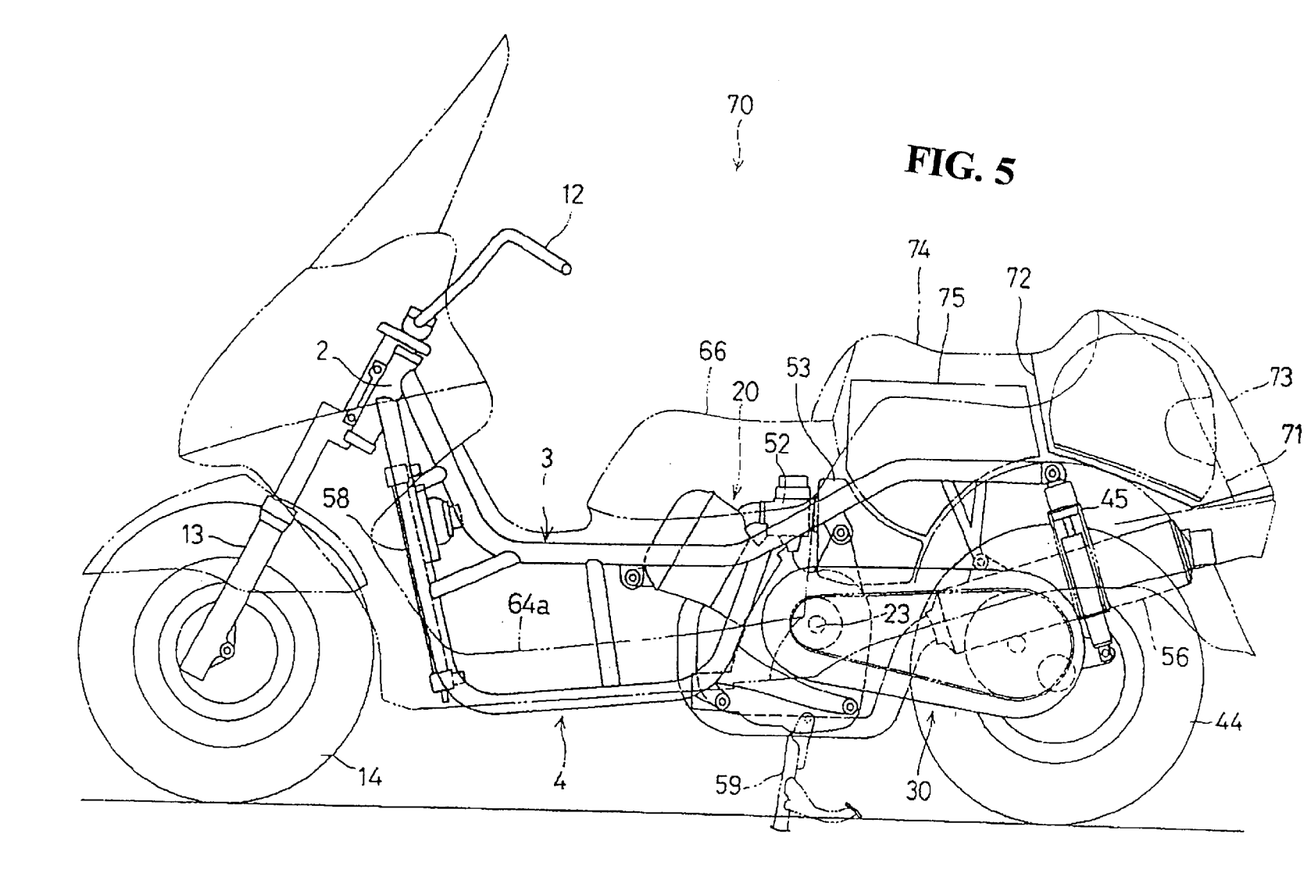
FIG. 5 illustrates a side elevation view illustrating an entire body of a scooter type motorcycle according to another embodiment of the present invention.

Subsequently, another embodiment of a scooter type motorcycle 70 in which a structure of a rear portion of a vehicle body is changed will be illustrated in FIG. 5.

Meanwhile, the same signal will be employed for the same member as the embodiment described above.

In the present scooter type motorcycle 70, a helmet containing box 72 is formed at a rear portion of a rear cover 71 and an opening facing rearwardly of the helmet containing box 72 is closed by a cover member 73 in a freely openable and closable manner.

A passenger's seat 74 is provided between the helmet containing box 72 and a rider's seat 66 in a freely openable and closable manner and a fuel tank 75 is disposed on a downward side of a passenger's seat 74.

An air cleaner 53 is arranged along a front side bottom face of a fuel tank 75.

Since the passenger's seat 74 is arranged on a one stage higher level than that of the rider's seat 66, a space to arrange the fuel tank 75 on the downward side of the passenger's seat 74 can sufficiently be secured and also the helmet containing box 72 can be provided rearwardly of the fuel tank 75.

Since a large space can be obtained on a forward side of an internal combustion engine 20, the space can be utilized as an articles containing portion or for arrangements of accessories.

Figure 6:
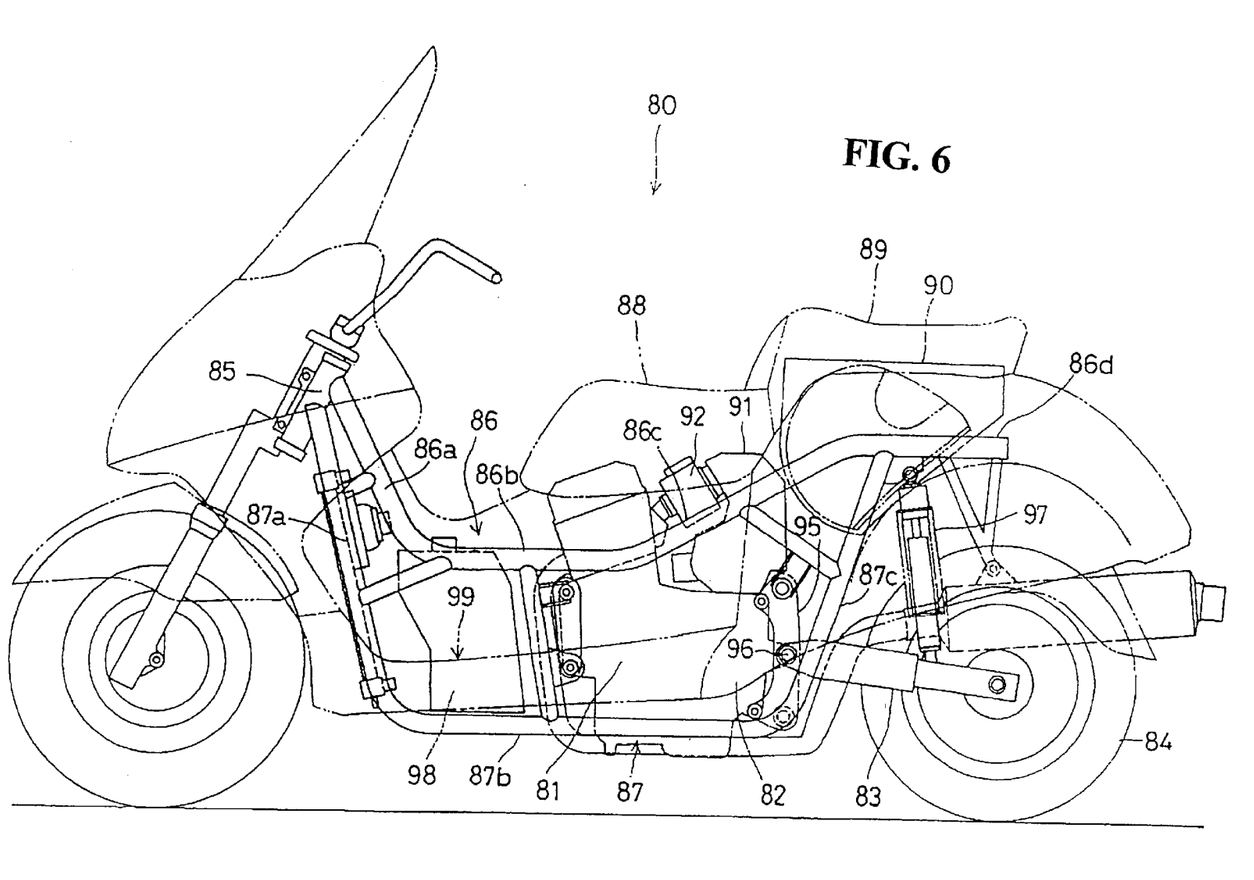
FIG. 6 illustrates a side elevation view illustrating an entire body of a scooter type motorcycle according to still another embodiment of the present invention.

A scooter type motorcycle 80 according to still another embodiment will be described accompanying an illustration in FIG. 6.

The present scooter type motorcycle 80 is constituted in such a manner so that an internal combustion engine 81 is provided with a transmission 82 integral with a crank case, a rear fork 83 which is independent of the internal combustion engine 81 and is a separate body from the transmission 82, is supported in a freely swingable manner, while a rear wheel 84 is pivotally supported at a rear end thereof.

In a vehicle body frame, a pair of left and right main pipes 86, 86, which extend from an upper portion of a head pipe 85 have roughly the same shapes as those of the main pipes 2 described above, are composed of front side inclination portions 86a, central horizontal portions 86b, rear side inclination portions 86c, and rear side horizontal portions 86d. Further, a pair of left and right down pipes 87, 87 extend from a lower portion of the head pipe 85, and are composed of front side inclination portions 87a, central horizontal portions 87b, and rear side inclination portions 87c. However, the down pipes are different from the down pipes 4 described above, the central horizontal portions 87b extend backwardly to the rear side inclinations 87c which is bent oblique upwardly at back ends of the central horizontal portions 87b and are coupled to the rear side horizontal portions 86d of the main pipes 86.

The internal combustion engine 81 is mounted at rear half portions of the central horizontal portions 86b and 87b of the upside main pipes 86 and the downside down pipes 87 respectively, a fuel tank 85 is mounted at front half portions thereof 86b and 87b, and floor portions 99 are formed on the left and right sides of the fuel tank 98.

Accordingly, the internal combustion engine 81 is located rearwardly as compared to the floor portions.

A rider's seat 88 covers on the upward side of the internal combustion engine 81 in a freely openable and closable manner.

A passenger's seat 89 is arranged at a higher level rearwardly of the rider's seat 88, a helmet containing box 90 is provided on the downward side thereof 89, and an air cleaner 91 and carburetors 92 are disposed between the helmet containing box 90 and cylinders.

A bracket 95 is mounted at a back end of transmission cases of a transmission 82 provided rearwardly of a crank case of the internal combustion engine 81, a front end of the rear fork 83 is pivotally mounted on the bracket 95 by means of a pivot 96, and the rear wheel 84 is pivotally supported at the rear end of the rear fork 83 which is moved in a vertically swingable manner.

A rear cushion 97 is interposed between a center somewhat close to a rear position of the rear fork 83 and a front portion of the rear side horizontal portions 86d of the main pipes 86.

Since the rear wheel 84 is supported via the rear fork 83 which is swingable independent of the internal combustion engine 81, a swinging section is remarkably lightened in its weight, so that a high speed travelling operation of the vehicle can be improved.

Further, since the swinging section is small, there is no need to secure a large space on a periphery thereof, therefore efficient arrangement of parts can be realized.

In addition, since the internal combustion engine 81 is arranged rearwardly of the floor portions 99, large spaces are capable of securing for the floors and thus, at the same time, the fuel tank 98 can be provided at the floor portions 99.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A scooter motorcycle having a lower deck floor comprising:

an internal combustion engine arranged rearwardly of said floor and a downward side of a seat; and a rear wheel supported via a supporting member swingable independent of said internal combustion engine;

said supporting member includes a left fork member having a front end and a right fork member having a front end, a belt automatic transmission pivotally supported coaxially with a crank shaft of said internal combustion engine and said left and right fork members being supported on both sides of said crankcase on the internal combustion engine.

2. The scooter motorcycle according to claim 1, wherein a space for disposing accessories and articles provided on a frontward side of cylinders of said internal combustion engine is provided in a forward tilted manner.

3. The scooter motorcycle according to claim 1, further comprising:

a passenger's seat provided at a higher level rearwardly of a rider's seat;

a helmet containing box arranged on a downward side of the passenger's seat; and an air cleaner arranged along a bottom face of the helmet containing box.

4. A scooter motorcycle having a lower deck floor comprising:

a frame including a head pipe and right and left main pipes extending rearwardly therefrom;

a floor portion disposed adjacent to and displaced a predetermined distance from the head pipe;

an internal combustion engine displaced a predetermined distance rearwardly of said floor portion and a downward side of a seat; and a rear wheel supported via a supporting member swingable independent of said internal combustion engine;

said supporting member includes a left fork member having a front end and a right fork member having a front end, a belt automatic transmission pivotally supported coaxially with a crank shaft of sa internal combustion engine and said left and right fork members being supported on both sides of said crankcase on the internal combustion engine.

5. The scooter motorcycle according to claim 4, wherein a space for disposing accessories and articles provided on a frontward side of cylinders of said internal combustion engine is provided in a forward tilted manner.

6. The scooter motorcycle according to claim 4, further comprising:

a passenger's seat provided at a higher level rearwardly of a rider's seat;

a helmet containing box arranged on a downward side of the passenger's seat; and an air cleaner arranged along a bottom face of the helmet containing box.

7. A scooter motorcycle having a lower deck floor comprising:
- a frame including a head pipe and right and left main pipes extending rearwardly therefrom;
- a floor portion disposed adjacent to and displaced a predetermined distance from the head pipe;
- an internal combustion engine displaced a predetermined distance rearwardly of said floor portion and a downward side of a seat, said internal combustion engine being mounted on said frame member; and
- a supporting member for mounting a rear wheel swingable independent of said internal combustion engine;
- said supporting member includes a left fork member having a front end and a right fork member having a front end, a belt automatic transmission pivotally supported coaxially with a crank shaft of said internal combustion engine and said left and right fork members being supported on both sides of said crankcase on the internal combustion engine.

8. The scooter motorcycle according to claim 7, wherein a space for disposing accessories and articles provided on a frontward side of cylinders of said internal combustion engine is provided in a forward tilted manner.

9. The scooter motorcycle according to claim 7, further comprising:
- a passenger's seat provided at a higher level rearwardly of a rider's seat;
- a helmet containing box arranged on a downward side of the passenger's seat; and
- an air cleaner arranged along a bottom face of the helmet containing box.

* * * * *